C. B. GEIGER.
VEHICLE SPRING.
APPLICATION FILED DEC. 18, 1909.
959,336.
Patented May 24, 1910.
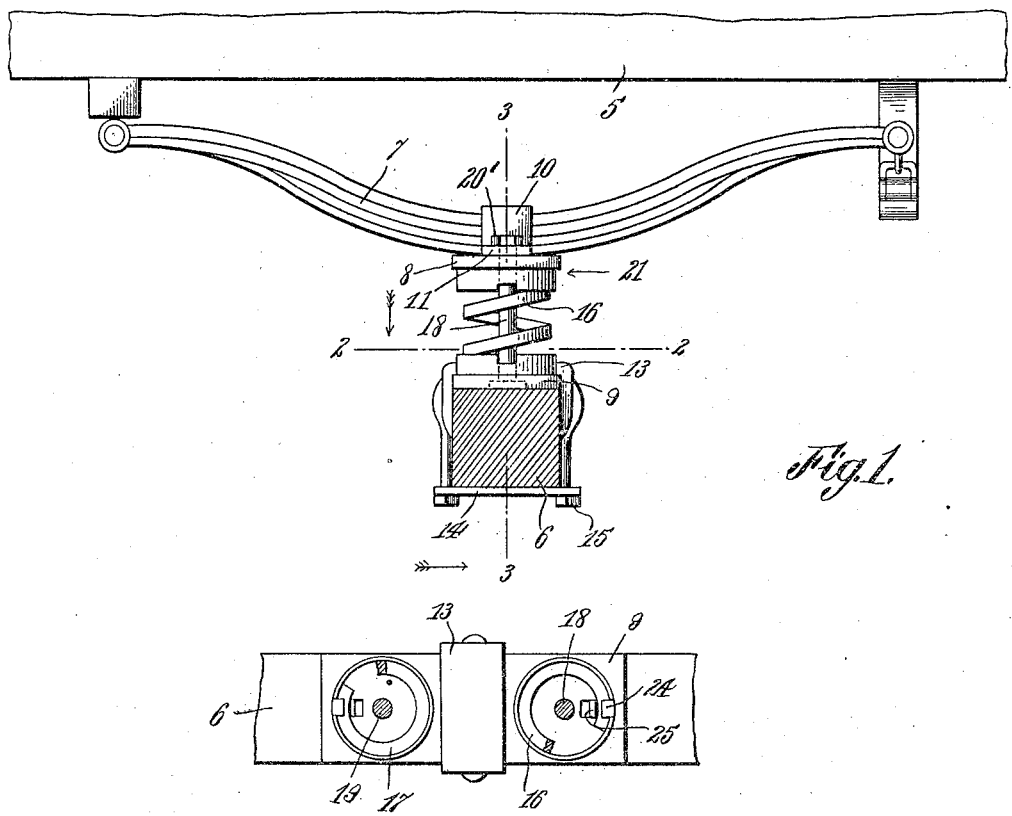
Fig. 1.
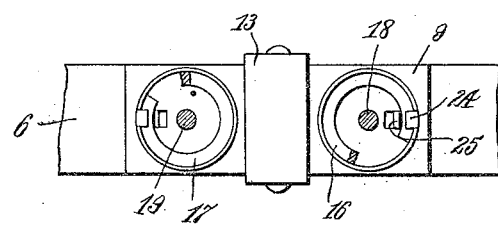
Fig. 2.
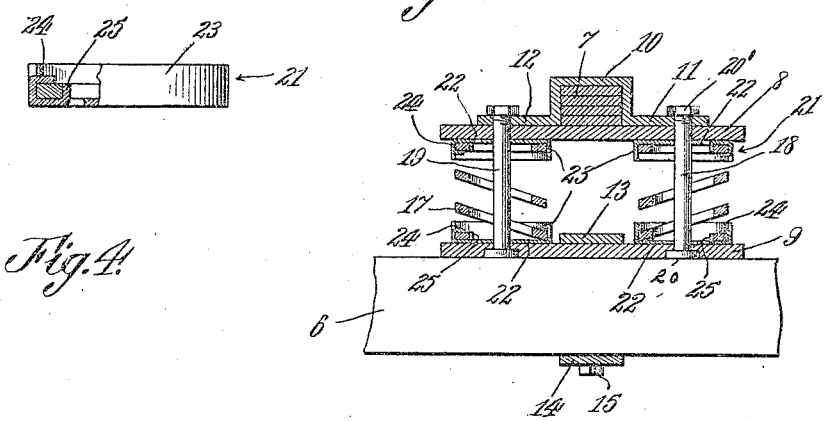
Fig. 4.
Fig. 3.
Witnesses
John H. Crawford
John Andonegui
Inventor
Charles B. Geiger,
By Victor J. Evans
Attorney

UNITED STATES PATENT OFFICE.

CHARLES B. GEIGER, OF MANNING, SOUTH CAROLINA.

VEHICLE-SPRING.

959,336.  Specification of Letters Patent.  Patented May 24, 1910.

Application filed December 18, 1909. Serial No. 533,931.

*To all whom it may concern:*

Be it known that I, CHARLES B. GEIGER, a citizen of the United States, residing at Manning, in the county of Clarendon and State of South Carolina, have invented new and useful Improvements in Vehicle-Springs, of which the following is a specification.

This invention relates to improvements in attachments for vehicles and has for one of its objects the provision of a device of that kind arranged between the vehicle axle and body springs and constructed to absorb a considerable amount of shock produced by the wheels rolling over rough ground, whereby the jar on the body springs and consequent jolting experienced by the occupants of a vehicle provided with a flat or cushion tire will be reduced to a minimum.

Another object is the provision of a shock absorber provided with means for preventing accidental displacement of the shock absorbing springs.

A further object is the provision of a device that may be applied to most forms of vehicles now in use without the necessity of any expensive alterations in the vehicle.

With these and other objects in view, which will more fully hereinafter appear, the present invention consists in certain novel details of construction and arrangement of parts, hereinafter fully described, illustrated in the accompanying drawings and more particularly pointed out in the appended claims, it being understood that various changes in the form proportion, size and minor details of the device may be made within the scope of the appended claims without departing from the spirit or sacrificing any of the advantages of the invention.

In the accompanying drawings, forming a part of the specification:—Figure 1 is a side elevation of the device and showing its application to a vehicle axle and body spring. Fig. 2 is a sectional plan view approximately on the line 2—2 of Fig. 1. Fig. 3 is a vertical, sectional view approximately on the line 3—3 of Fig. 1. Fig. 4 is a detail, side elevation of one of the combined guides and holders with a portion of the side broken away and disclosing the means for fixedly securing the terminal of the spring thereto.

Similar numerals of reference are employed to designate corresponding parts throughout.

The body of the vehicle is designated by the numeral 5, the axle by the numeral 6 and the semi-elliptical spring by the numeral 7.

While I have shown the device employed with a spring of the semi-elliptical type, it must be understood that I am not to be limited to its specific employment since it will be understood how the device may be equally as well employed with body springs of other types.

The device forming the subject matter of the present invention includes in its construction what will subsequently be termed an upper plate 8 and a lower plate 9. These members are to be fixedly secured in any preferred manner to the spring 7 and axle 6. Securing means for the upper plate as shown in the drawings comprising a yoke 10 which straddles the spring 7 and has oppositely extending arms 11 and 12 which are bolted or otherwise secured to the plate 8, the lower plate 9 being similarly secured to the axle by means of a clevis 13, the terminals of which are connected by a plate 14 which is secured in place by means of a pair of nuts 15 threadable on the terminals of the clevis.

The upper and lower plates 8 and 9 are held in spaced relation by means of a pair of helical springs 16 and 17. These members are interposed between the plates 8 and 9 and their axes are in alinement with a pair of openings formed in the upper and lower plates, the openings in the said plates receiving pins 18 and 19, the lower ends of which are provided with heads 20 arranged in depressions on that face of the lower plate bearing on the axle 6 while their upper ends extend through the upper plate 8 and are screw-threaded and provided with nuts 20'. By means of this construction it is evident that turning the nuts 20' in one direction will result in increasing the tension on the springs 16 and 17. In order to prevent the accidental displacement of the springs 16 and 17, the following construction is employed:—

By reference now to Figs. 1 and 3, it will be seen that arranged at the opposite ends of each spring are a pair of combined guides and holders designated in general by the numeral 21. Since these members are identical in structure, the description of one will be sufficient. By reference to Fig. 3, it will be seen that the holder at the upper end of the spring 17 comprises a bearing plate 22 from the periphery of which depends a flange 23. The diameter of the bearing plate 22 corresponds approximately to the diameter of the spring 17 while the width of the flange 23 is somewhat greater than the thickness of one helix of the spring 17 so that when the parts are in the position shown in Fig. 3, the lower edge of the flange will extend below the upper end helix. An inwardly extending lug is designated by the numeral 24 and is formed in the flange 23 by forming in the latter a pair of spaced incisions, the metal therebetween being bent inwardly. The incisions extend to a point substantially in a plane with the lower side of the end helix of the spring 17 so that when the metal is turned inwardly to provide the lug 24, the latter will be spaced from the bearing plate 22 for a distance corresponding approximately to the thickness of the said end helix. Projecting vertically downwardly from the bearing plate 22 is a lug 25. This member is spaced from the flange 23 for a distance corresponding approximately to the width of the end helix of the spring 17. The function of these lugs 24 and 25 is to receive the upper terminal of the spring 17 whereby accidental displacement due of the jarring on the side spring 17 will be positively prevented during the movement of the vehicle. The bearing plate 22 is centrally provided with an opening for the reception of the pin 19. It will, of course, be understood that the plate arranged at the lower end of the spring 17 will have its peripheral flange extending vertically upward and the lugs arranged to receive the terminal of the lower end helix of the spring 17.

With this construction it is evident that the opposite ends of the spring will be securely locked against displacement. It will be further observed that the device is exceedingly simple in structure and inexpensive in manufacture, embodying few parts and these so arranged that the danger of derangement will be reduced to a minimum.

Having thus described the invention, what is claimed, is:—

1. In a shock absorber for vehicles, the combination with an axle and body spring, of upper and lower plates fixedly secured to said body spring and axle, helical springs interposed between said plates and dished holders arranged on the opposite terminals of said springs and bearing on said plates, and tension rods passing through said springs, plates and dished holders.

2. In a shock absorber, a helical compression spring, a combined guide and holder arranged on one end of the spring and having a flat annular bearing surface provided with a peripheral flange to bear on the outer side of the end helix of said spring, an inwardly extending lug on said flange bearing on the terminal of the said end helix and a vertical lug on said flat bearing surface bearing on the inner side of the said end helix.

In testimony whereof I affix my signature in presence of two witnesses.

CHARLES B. GEIGER.

Witnesses:
T. MITCHELL WELLS,
DAISY E. CROUDER.